ical Host 110

(12) United States Patent
Tsirkin

(10) Patent No.: US 11,327,781 B2
(45) Date of Patent: May 10, 2022

(54) ZERO COPY MESSAGE RECEPTION FOR APPLICATIONS

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 125 days.

(21) Appl. No.: 16/424,132

(22) Filed: May 28, 2019

(65) Prior Publication Data
US 2020/0379791 A1    Dec. 3, 2020

(51) Int. Cl.
G06F 9/455      (2018.01)
G06F 12/1009    (2016.01)
G06F 3/06       (2006.01)

(52) U.S. Cl.
CPC ........ *G06F 9/45558* (2013.01); *G06F 3/0604* (2013.01); *G06F 3/067* (2013.01); *G06F 3/0646* (2013.01); *G06F 12/1009* (2013.01); *G06F 2009/45583* (2013.01)

(58) Field of Classification Search
CPC ...... G06F 3/0604; G06F 3/0646; G06F 3/067; G06F 12/1009; G06F 9/45558; G06F 2009/45583
USPC .......................................................... 711/6
See application file for complete search history.

(56) References Cited

U.S. PATENT DOCUMENTS

| 8,413,145 | B2 * | 4/2013 | Chou ................. G06F 11/2097 |
| | | | 718/1 |
| 8,533,713 | B2 * | 9/2013 | Dong .................... G06F 9/4856 |
| | | | 718/1 |
| 9,092,426 | B1 | 7/2015 | Bathija et al. |
| 9,189,446 | B2 | 11/2015 | Hunter et al. |
| 9,575,796 | B2 | 2/2017 | Tsirkin |
| 9,875,132 | B2 | 1/2018 | Tsirkin |
| 9,912,787 | B2 * | 3/2018 | Tsirkin ................ H04L 12/4633 |
| 2014/0149634 | A1 * | 5/2014 | Tosatti ................ G06F 9/45558 |
| | | | 711/6 |
| 2016/0350261 | A1 * | 12/2016 | Tsirkin ................ G06F 12/0292 |
| 2018/0239715 | A1 | 8/2018 | Tsirkin et al. |

OTHER PUBLICATIONS

XDP—Challenges and Future Work; Jesper Dangaard Brouer et al.; LPC Networking Track, Vancouver, Nov. 2018, pp. 1-30.
(Continued)

*Primary Examiner* — Reginald G Bragdon
*Assistant Examiner* — Aaron D Ho
(74) *Attorney, Agent, or Firm* — K&L Gates LLP

(57) ABSTRACT

Zero copy message reception for guests is disclosed. For example, a host has a memory, a device with access to device memory addresses, a processor, and a supervisor. An application with access to application memory addresses (AMA) executes on the host. An AMA is mapped to a page table entry (PTE). The application shares access to a first page of memory addressed by the AMA with the device to store data received by the device for the first application, where the first page is mapped as a device memory address of the plurality of device memory addresses. The application later sends a request to disconnect from the device. The supervisor is configured to copy contents of the first page to a second page in the memory after receiving the request to disconnect, and then update the PTE to address the second page instead of the first page.

20 Claims, 8 Drawing Sheets

(56) References Cited

OTHER PUBLICATIONS

ZeCoRx—Zero Copy Receive, Mikelangelo, Horizon 2020 Project on Virtualization, Cloud Computing, and HPC, pp. 1-4, https://www.mikelangelo-project.eu/technology/zecorx-zero-copy-receive/; retrieved Mar. 4, 2019.

* cited by examiner

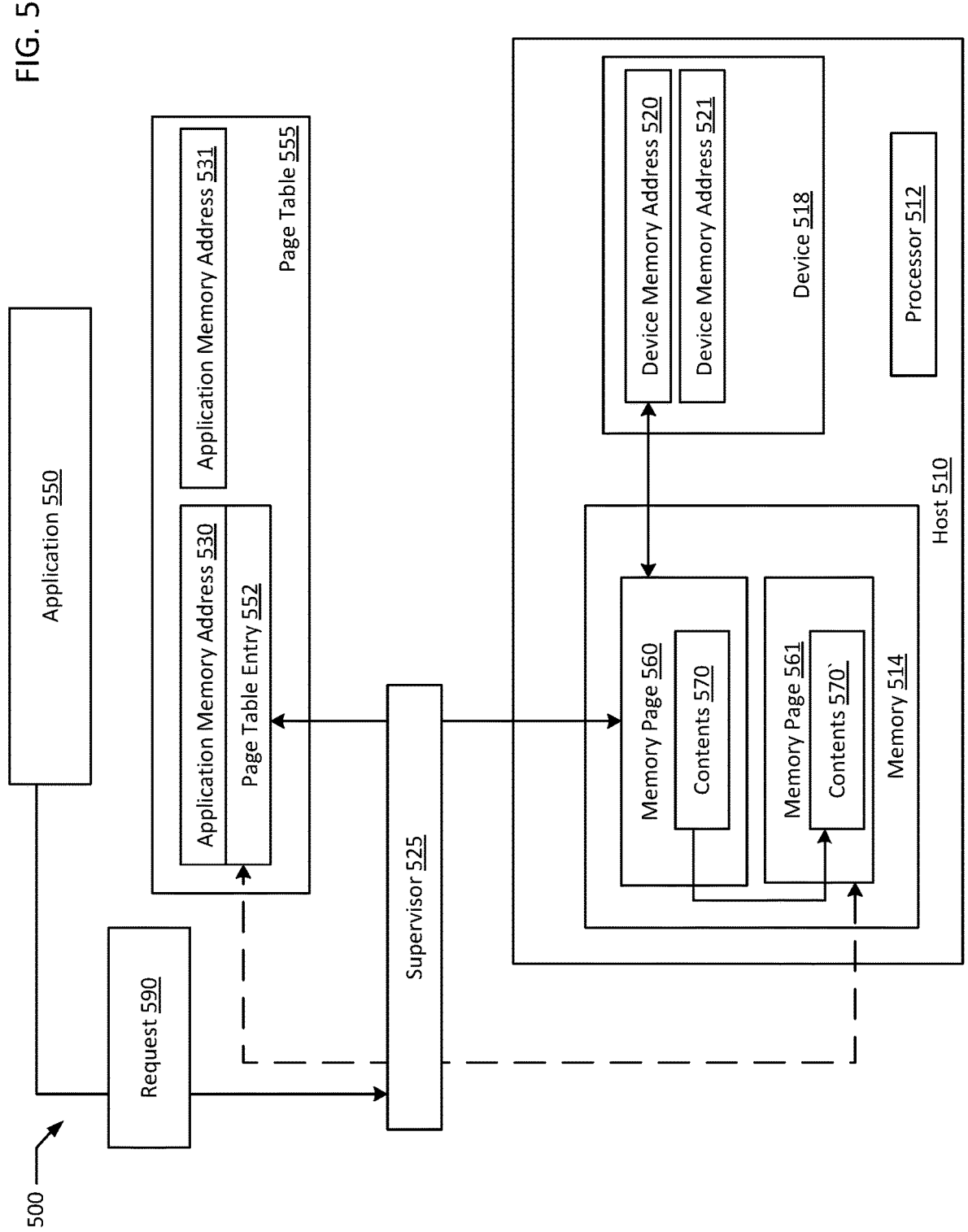

ZERO COPY MESSAGE RECEPTION FOR APPLICATIONS

BACKGROUND

The present disclosure generally relates to virtualized computer systems. For scalability and efficiency reasons, many computer systems employ virtualized guests such as virtual machines and containers to execute computing tasks performed by the computing systems, such as for hosting application programs. Typically, guests such as containers and virtual machines may be launched to provide extra compute capacity of a type that the guest is designed to provide, while isolating compute resources used by different users and tenants away from those of other users. Guests enable a programmer to quickly scale the deployment of applications to the volume of traffic requesting the applications, and they may be deployed in a variety of hardware environments. Multiple guests may also be clustered together to perform more complex functions than the respective guests are capable of performing individually. To interact with a broader set of users and a broader computing ecosystem, guests typically employ virtualized devices such as input/output ("I/O") devices controlled by drivers, including virtualized network interfaces. These interactions are typically in the form of messages transmited from one computing device (e.g., a physical host or a virtual guest) that are received by another computing device.

SUMMARY

The present disclosure provides a new and innovative system, methods and apparatus for zero copy message reception for applications. In an example, a host has a memory, a device with access to a plurality of device memory addresses in the memory, a processor, and a supervisor. An application is configured to execute on the host, where the application has access to a plurality of application memory addresses (AMA) in the memory, including an AMA mapped to a page table entry (PTE) in a page table. The application shares access to a first page of memory addressed by the AMA with the device to store data received by the device for the first application, where the first page is mapped as a device memory address of the plurality of device memory addresses. The application later sends a request to disconnect from the device. The supervisor is configured to copy contents of the first page to a second page in the memory after receiving the request to disconnect, and then update the PTE to address the second page instead of the first page.

Additional features and advantages of the disclosed method and apparatus are described in, and will be apparent from, the following Detailed Description and the Figures.

BRIEF DESCRIPTION OF THE FIGURES

FIG. 5 is a block diagram of an example zero copy message reception system according to an example of the present disclosure.

DETAILED DESCRIPTION OF EXAMPLE EMBODIMENTS

Figure 1:
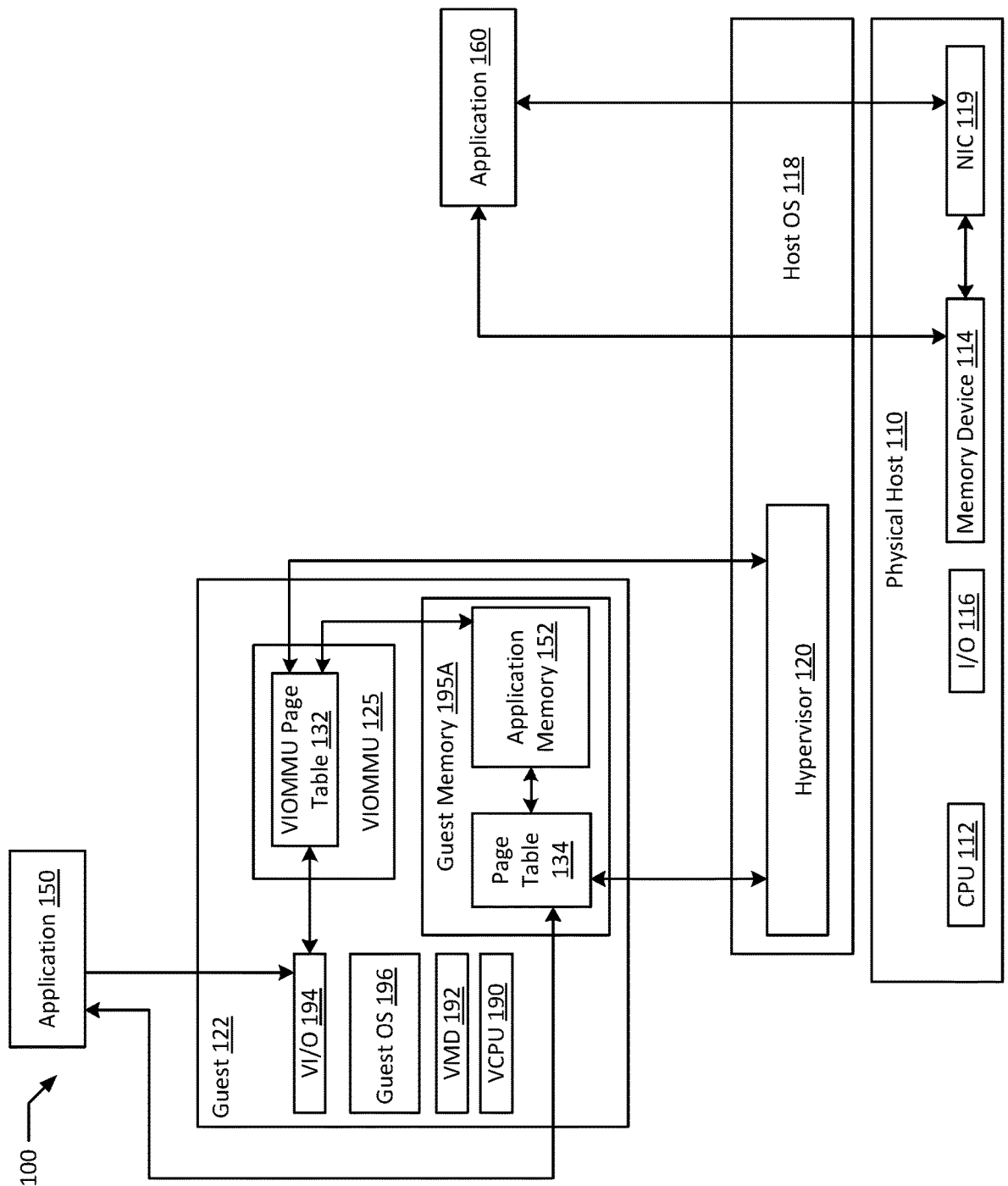
FIG. 1 is a block diagram of a system implementing zero copy message reception for applications according to an example of the present disclosure.

In many computer systems, physical hardware may host guests such as virtual machines and/or containers. In an example, a virtual machine ("VM") may be a robust simulation of an actual physical computer system utilizing a hypervisor to allocate physical resources to the virtual machine. In sharing physical computing resources, guests and/or a hypervisor controlling them, may also have access to shared components of the underlying host, for example, I/O devices (e.g., network interface cards ("NICs"), storage controllers, USB controllers, PS2 interfaces, etc.). Such access is typically restricted through a virtualization manager such as a hypervisor to ensure that virtual environments remain segregated and to prevent unauthorized access to other virtual environments on the same host, or to the host itself. When physical or virtual computer systems or computing devices (e.g., storage devices, networking devices, etc.) communicate with each other, a message is typically sent from one computer system to another. This message is typically copied multiple times. For example, a first copy of the message is created and saved to memory by an application in the application's memory address space. The message may then be copied to a supervisor's memory space (e.g., an operating system), where the supervisor has a driver controlling access to a communication device. This second copy may typically require a context switch to higher access privileges controlled by the supervisor. In a virtual system, a guest supervisor may lack direct access to physical devices, requiring another copy of the data to the memory space of a higher level supervisor (e.g., a hypervisor), with access to physical computing devices. Another copy of data may be made into device memory accessible to the computing device. When a destination system receives the message, these copies may be made in reverse order in order for a destination application to access the data. For example, a device receives the message in a receiving buffer in device memory, the contents of which are copied to hypervisor memory on the destination host, which is then copied into a guest operating system receiving buffer of a virtual device, and then finally copied into application memory of the destination application.

Each of these copies made typically requires CPU processing cycles. In many modern computer systems, networking bandwidth and throughput often exceeds the copy rate of data from one area of memory to another, causing the copying steps to become a bottleneck in networking throughput. Therefore, eliminating any of the additional copying steps in the process flow described above may result in significant latency enhancements, as well as memory consumption benefits. An operation that requires data to be copied may be converted into an operation that does not require copying, and the operation that does not require copying is typically referred to as a zero copy operation. In data transmission, zero copy may be achieved by providing supervisors and/or devices with direct memory access (DMA) to the part of an application's memory space reserved as a transmission buffer. This works because the system always knows the data that it intends to send out, and the intended recipient of such data. However, zero copy receiving is more problematic because the size of the message received as well as the intended recipient may not be immediately available to the receiving computer system. Various solutions have been attempted. For example, one option is to map the memory addresses of device receiving buffers to the address space of the message's intended recipient (e.g., guest supervisor or application) after the message is received. Such page mapping typically results in significant processing overhead (e.g., due to requiring CPU cache flushes) which causes the latency advantages of such zero copy systems to be minimal, if any. Alternatively, assigning a portion of the receiving application's memory to the device hardware as a receiving buffer offers some performance advantages, but results in the application being unable to reclaim that memory (e.g., to disconnect from the device) without resetting the hardware device and the hardware device's memory space, which is typically not an option in shared hardware computer systems implementing virtualization. The application is typically unable to reclaim the memory shared with the device because a hardware device's memory buffers are typically restricted from being reclaimed without resetting the device unless the memory buffers are filled, and a computer system typically lacks control over when data is received so the computer system would be unable to control when memory buffers shared between applications and devices are filled and reclaimable.

The present disclosure provides for zero copy message reception by eliminating copying of data between a receiving device and a receiving application, resulting in faster message transmission for storage and networking devices. In an example, an application requesting zero copy message reception allocates a portion of its memory as a receiving buffer, which is then shared to a device as device memory. The device is granted access to the receiving buffer and is configured to utilize the shared receiving buffer for any messages targeting the application. If the application requests to disconnect from the device (e.g., ending a communication session), a supervisor controlling both the application and device (e.g., a host hypervisor), copies the contents of the receiving buffer to a new section of memory and remaps the virtual memory addresses used by the application to address the original receiving buffer to this new section of memory. The original buffer is therefore still accessible to the device, while the new copy is accessible to the application, and neither the application nor the device needs to know that the copy occurred. The original buffer may then be reclaimed by the supervisor after being filled by the device, for example, with messages received after the application disconnects, or with messages subsequently received for a different application (which may or may not be configured for zero copy receive). Alternatively, the original buffer may be reclaimed by the supervisor after emptying the buffer (e.g., deleting its contents), which does not affect the application's access to the contents due to the copy made for the application. By enabling a supervisor to seamlessly dissociate an application from its shared memory buffer, application memory usage is not constrained by device memory usage, and therefore the application may freely reuse its memory even if memory previously shared with a device is still held by the device. Therefore, at the cost of some of the memory savings of a purely zero copy system (e.g., due to double memory usage for a transient period of time upon an application disconnecting from a device), the throughput and latency advantages of zero copy reception may generally be achieved.

FIG. 1 is a block diagram of a system implementing zero copy message reception for applications according to an example of the present disclosure. The system 100 may include one or more physical host(s) 110. Physical host 110 may in turn include one or more physical processor(s) (e.g., CPU 112) communicatively coupled to memory device(s) (e.g., MD 114) and input/output device(s) (e.g., I/O 116). As used herein, physical processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device 114 refers to volatile or non-volatile memory devices, such as RAM, ROM, EEPROM, or any other device capable of storing data. As discussed herein, I/O device(s) 116 refer to devices capable of providing an interface between one or more processor pins and an external device, the operation of which is based on the processor inputting and/or outputting binary data (e.g., storage devices, network devices, keyboards, mice, monitors, etc.). For example, a network interface card (e.g., NIC 119) may be an example of an I/O device through which physical host 110 and guests 122 and/or 124 hosted on physical host 110 communicates with external systems over a network. CPU(s) 112 may be interconnected using a variety of techniques, ranging from a point-to-point processor interconnect, to a system area network, such as an Ethernet-based network. Local connections within physical host 110, including the connections between processor 112 and a memory device 114 and between processor 112 and I/O device 116 may be provided by one or more local buses of suitable architecture, for example, peripheral component interconnect (PCI).

In an example, physical host 110 may host one or more guests, for example, guest 122. In an example guests may be VMs and/or containers, which may host additional nested layers of guests. In an example, guest 122 is an application executing on host OS 118 and hypervisor 120. In an example application 150 may be another virtual guest nested inside of guest 122. Application 150 may be any form of executable program that executes on guest 122. In an example, a container as referred to herein may be implemented with any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, guest 122 may be a VM executing on physical host 110. In an example, an executable program (e.g., application 150) executes on VM 122, which may be another guest (e.g. a container or VM). In addition, containers and/or VMs may further host other guests necessary to execute their configured roles (e.g., a nested hypervisor or nested containers). For example, a VM (e.g., guest 122) and/or a container may further host a Java® Virtual Machine ("JVM") if execution of Java® code is necessary.

System 100 may run one or more VMs (e.g., guest 122), by executing a software layer (e.g., hypervisor 120) above the hardware and below the guest 122, as schematically shown in FIG. 1. In an example, the hypervisor 120 may be a component of respective host operating system 118 executing on physical host 110. In another example, the hypervisor 120 may be provided by an application running on host operating system 118. In an example, hypervisor 120 may run directly on physical host 110 without an operating system beneath hypervisor 120. Hypervisor 120 may virtualize the physical layer, including processors, memory, and I/O devices, and present this virtualization to guest 122 as devices, including virtual central processing unit ("VCPU") 190, virtual memory devices ("VIVID") 192, virtual input/output ("VI/O") device 194, and/or guest memory 195. In an example, an 10 memory management unit ("IOMMU") may manage memory access to system memory from an I/O device. In an example, VI/O 194 may be a virtual device whose memory space is managed by a virtual IOMMU 125 via one or more VIOMMU page tables (e.g., VIOMMU page table 132). In an example, VIOMMU page table 132 and/or VIOMMU 125 may be managed by a guest supervisor of guest 122 (e.g., guest OS 196), for example, through a driver. In an example, VI/O 194 may be a virtual network interface through which guest 122 communicates with external computing resources (e.g., physical host 110, and other hosts or guests over a network). In an example, a physical I/O device (e.g., I/O 116, NIC 119) may be virtualized to provide the functionality of the physical device to a virtual guest. In an example, hypervisor 120 may host VIOMMU 125 to manage memory access for VI/O 194. In an example, VIOMMU 125 may execute independently, as part of host OS 118, as part of hypervisor 120, or within a virtualized guest (e.g., guest 122). In an example, a guest 122 may be a virtual machine and may execute a guest operating system 196 which may utilize the underlying VCPU 190, VMD 192, and VI/O 194. Processor virtualization may be implemented by the hypervisor 120 scheduling time slots on physical processors 112 such that from the guest operating system's perspective those time slots are scheduled on a virtual processor 190.

In typical computer systems, there may be more data referenced by executing applications (both applications executing on physical hardware and those in virtualized guests on the physical hardware) than there is memory available on the system. Typically, memory virtualization is implemented to allow memory to be shared among these various processes. For example, data may be loaded to memory when it is needed for a program to execute, and then moved to slower storage such as hard disk when the data is not being accessed. In an example, memory paging is implemented to track the virtual addresses of the data of executing applications (e.g., guest 122, application 150, VIOMMU 125, etc.). A given memory address may be referenced by any number of virtual addresses. Page tables (e.g., page table 134, VIOMMU page table 132) that perform lookups to translate between virtual and memory addresses may be implemented with granular access controls, such that a given execution context may access only those memory locations that it has permission to access based on those memory locations being available for translation in a corresponding page table.

Guest 122 may run on any type of dependent, independent, compatible, and/or incompatible applications on the underlying hardware and host operating system 118. In an example, a container or application (e.g., application 150) running on guest 122 may be dependent on the underlying hardware and/or host operating system 118. In another example, a container or application (e.g., application 150) running on guest 122 may be independent of the underlying hardware and/or host operating system 118. In an example, a container or application (e.g., application 150) running on guest 122 may be compatible with the underlying hardware and/or host operating system 118. Additionally, a container or application (e.g., application 150) running on guests 122 and 124 may be incompatible with the underlying hardware and/or OS. The hypervisor 120 may manage memory for the host operating system 118 as well as memory allocated to the guest 122 and guest operating system 196 such as guest memory 195 provided to guest OS 196.

In an example, application 160 is another executable program that executes directly on host OS 118, with access to network interface card (NIC) 118 as well as memory device 114. In an example, application 160 may be a virtual guest (e.g., a container or VM). In another example, application 160 may be any form of network accessible application that receives messages over a network. In an example, application 160's access to a network is controlled by host OS 118 (e.g., a network driver associated with NIC 119 executing in host OS 118).

In an example, any form of suitable network for enabling communications between computing devices, for example, a public network (e.g., the Internet), a private network (e.g., a local area network (LAN) or wide area network (WAN)), or a combination thereof may be employed to connect physical host 110, guest 122, application 150 and/or 160, and/or to other computer systems. In an example, NIC 119 provides an interface between one or more of physical host 110, application 150 or 160, guest 122, and a network. In various examples, an IOMMU (e.g., VIOMMU 125) may be a physical hardware component, a software component, or a combination of both hardware and software. In an example, one or more page tables (e.g., VIOMMU page table 132, page table 134) may provide translation for virtual addresses (e.g., via page table entries) to physical memory addresses in memory device 114. In the example, VIOMMU 125 and/or hypervisor 120 may provide an interface between page table 130, VIOMMU page table 132 and memory device 114. In an example, VIOMMU 125 and/or hypervisor 120 may further provide an interface between virtual memory devices (e.g., guest memory 195, VIVID 192) and memory device 114. In an example, memory device 114 may be implemented with a translation lookaside buffer (TLB), that stores recent translations of virtual memory addresses to physical memory addresses that is queried prior to querying a page table for a given translation. In an example, a TLB cache may be a physical or virtual component caching recent translation results that may be quickly accessed by CPU 112, and lookups from a TLB cache may be significantly faster than page table lookups. In an example, a context switch between an unprivileged account (e.g., an account executing application 150 or 160) and a privileged account (e.g., hypervisor 120, host OS 118) may require flushing CPU caches such as TLB caches for security purposes. In such examples, avoiding a context switch (e.g., via a zero copy operation) may significantly increase processing throughput.

In an example, VI/O 194 is allocated a section of memory as device memory, and this section of memory is also virtualized in guest memory 195. In the device memory, guest OS 196, VI/O 194, and/or a driver of VI/O 194 allocates certain memory addresses related to queueing messages for transmission, and other memory addresses for queueing messages received. These memory addresses are addressed via 10 virtual addresses ("IOVAs") translated by VIOMMU page table 132 into guest memory addresses of guest 122. In an example, a hypervisor page table may be used to translate guest memory addresses into host memory addresses of physical host 110 in memory device 114. In an example, application 150 may be provided access to the same host memory address allocated as a receiving queue or buffer for VI/O 194. For example, application 150 may address the same physical block of memory with a different guest memory address translated via page table 134. In the example, application 150 is provided with access to a range of guest memory addresses (e.g., application memory 152), with access managed via page table 134 used to address separate blocks or pages of memory in application memory 152. In an example, by having application 150 designate a portion of application memory 152 as a receiving buffer for messages targeted at application 150, and sharing access (e.g., via hypervisor 120) to the memory addressed by such receiving buffer to VI/O 194, both application 150 and VI/O 194 may directly access the same memory locations. In an example, application 150 may address the shared memory locations via page table entries and virtual addresses in page table 134, while VI/O 194 may address the shared memory locations via IOVAs translated via VIOMMU page table 132. In another example, a supervisor, (e.g., hypervisor 120, host OS 118) may grant direct memory access for VI/O 194 or guest OS 196 to the host memory addresses addressed by the application via guest virtual addresses translated with page table 134. In an example, VI/O 194 may address memory via guest OS 196 (e.g., via page tables of guest 122) without an IOMMU (e.g., VIOMMU 125). In the example, guest 122 may be implemented with a VI/O 194 that is configured to appear to be an external communication device to guest OS 196, used by application 150 to send and receive messages to and from outside guest 122.

In an example, application 160 may similarly address a block of application memory on memory device 114 via virtual memory addresses of physical host 110. In the example, NIC 119 may also access memory locations in memory device 114 via virtual memory addresses accessible to NIC 119. In an example, application 160 may designate a range of application 160's virtual memory addresses as a receiving buffer for messages received by NIC 119 that are targeted to application 160. Host OS 118 may then share access to this receiving buffer to NIC 119, which may address the memory locations of the receiving buffer with its own set of virtual addresses.

FIGS. 2A-D are block diagrams illustrating a device providing zero copy message reception for applications on a host according to an example of the present disclosure. In the illustrated example, application 150 is configured for zero copy message reception from a device (e.g., VI/O 194). In the illustrated example, VI/O 194 addresses memory via IOVAs (e.g., IOVA 231A, 232A) translated by a VIOMMU page table 132. In an example, system 200 illustrates application 150 being configured to receive messages via VI/O 194. In various examples of system 200, addresses represented with the same number and different letters are representations of the same address as they appear to different components of system 100 (e.g., guest 122, application 150, VI/O 194, physical host 110). For example, IOVA 231A is IOVA 231B, IOVA 232A is IOVA 232B, guest physical address ("GPA") 251A is the same as GPAs 251B-D, GPA 252A is the same as GPAs 252B-D, host physical address ("HPA") 271A is HPA 271B, HPA 272A is HPA 272B, guest virtual address ("GVA") 221A is GVA 221B, GVA 222A is GVA 222B, etc. In an example, application 150 has access to application memory 152, which includes memory locations mapped as GVAs 221A and 222A. These GVAs (e.g., represented as GVA 221B and 222B) are translated by page table 134 as GPAs 251A and 252A which are memory addresses in guest memory 195 (e.g., GPA 251B and 252B). In an example, the GPAs may additionally be translated into HPAs (e.g., HPAs 271A and 272A) via hypervisor page table 210, with HPAs 271A and 272A addressing memory locations on memory device 114 (e.g., HPA 271B and 272B).

In an example, application 150 requests to initiate zero copy message reception on VI/O 194, identifying GVAs 221A and 222A as a designated receiving buffer. In the example, a supervisor (e.g., hypervisor 120), identifies that GVAs 221A and 222A correspond to GPAs 251B and 252B. In the example, the supervisor grants access to these memory addresses (e.g., GPA 251B and 252B) to VI/O 194 as device memory addresses by mapping them to IOVAs 231B and 232B respectively. VI/O 194 then has access to GPAs 251B and 252B via IOVAs 231A and 232A. VI/O 194 is then configured to store messages received that are targeted at application 150 to the shared receiving buffer addressed by VI/O 194 as IOVAs 231A and 232A, and by application 150 as GVAs 221A and 222A. For example, application 150 may have its own IP address and/or MAC address assigned for receiving messages, allowing VI/O 194 to store the appropriate messages to the shared receiving buffer with application 150. In an example, these messages are ultimately stored in HPA 271B and 272B on memory device 114.

Figure 2A:
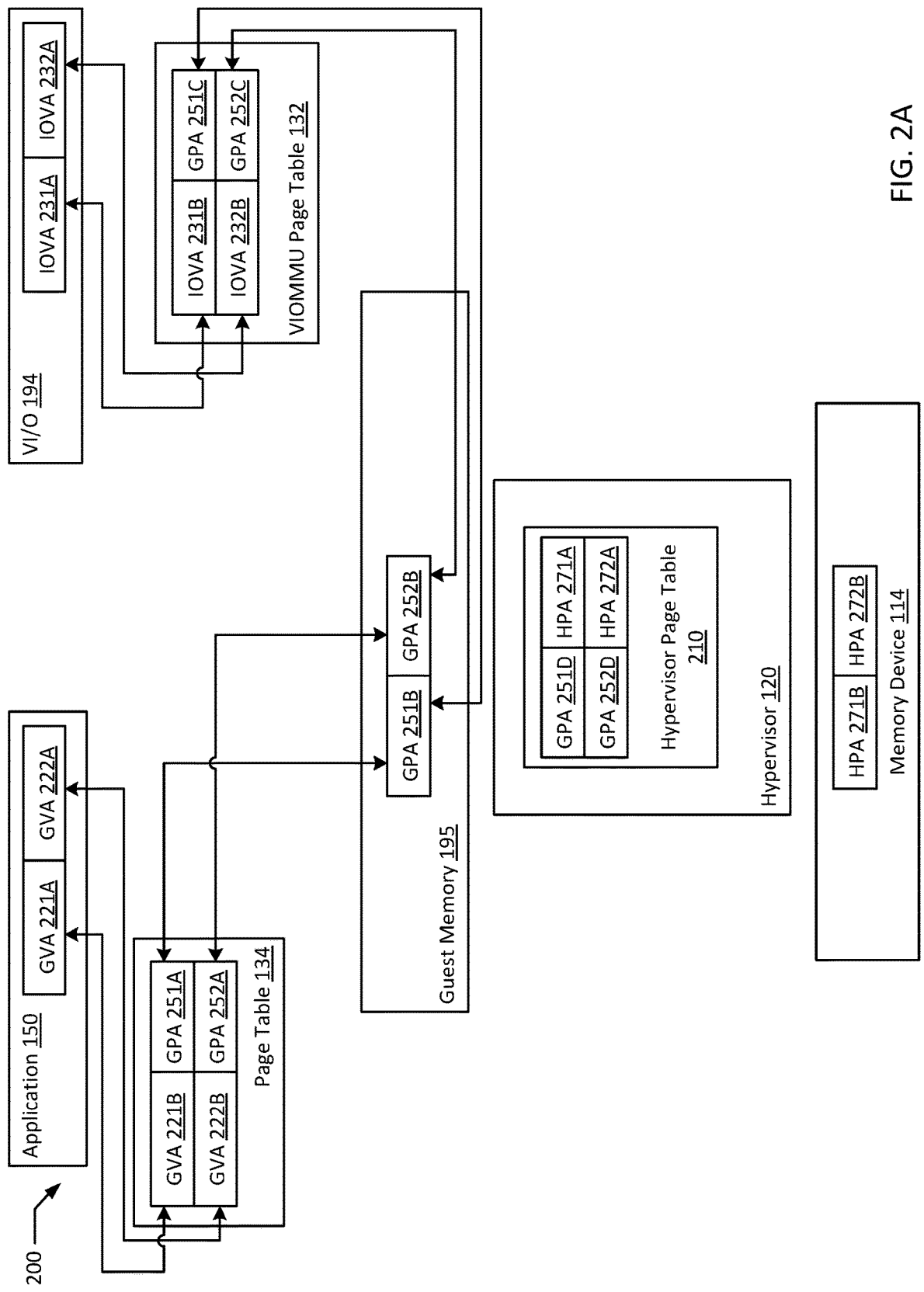
FIGS. 2A-D are block diagrams illustrating a device providing zero copy message reception for applications on a host according to an example of the present disclosure.
Figure 2B:
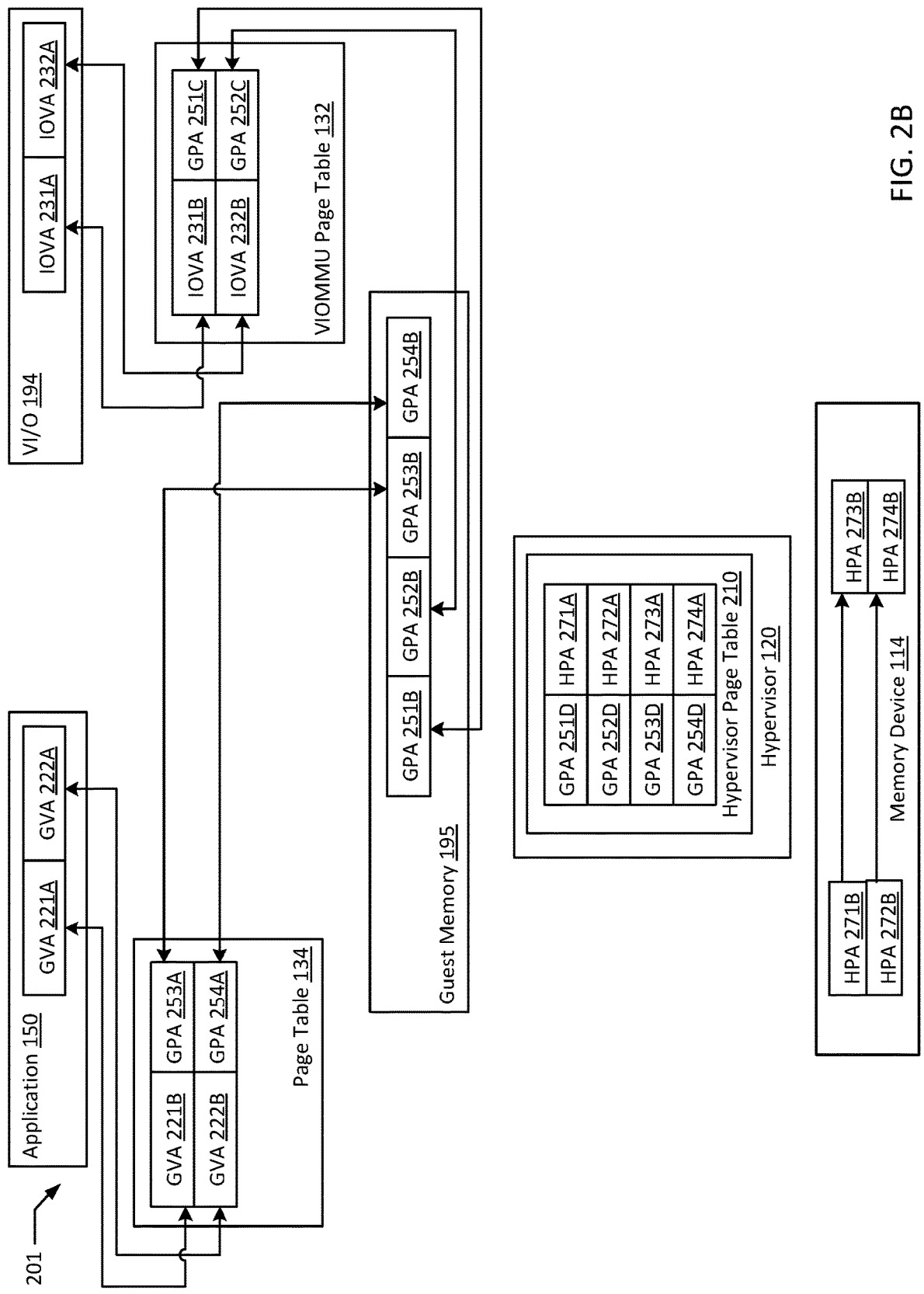

Illustrated system 201 in FIG. 2B is a later point in time for system 200, after application 150 requests to disconnect from VI/O 194 (e.g., to terminate its networking session). In the example, application 150 requests (e.g., to guest OS 196) to disconnect from VI/O 194, but application 150 will continue to execute. In an example, application 150 sends a system call or hypercall to disconnect from VI/O 194. In another example, a supervisor of application 150 (e.g., hypervisor 120, guest OS 196, host OS 118) detects application 150's disconnection without application 150 sending a message or command to disconnect. For example, application 150's networking session may time out after a configured timeout. In another example, application 150 may become unresponsive or crash resulting in the disconnection. In such examples, a renewed instance of application 150 may be launched with a recovered execution state of application 150 and resume execution of the crashed instance of application 150. It should be appreciated that references to a disconnection command herein are also applicable to a passively detected disconnection. In an example, GPAs 251B and 252B are not currently full, and are allocated as device memory to VI/O 194 and actively accessed by VI/O 194. Therefore, in the example, VI/O 194 may not be able to be disassociated from GPAs 251B and 252B without resetting the device memory space of VI/O 194, which would potentially disrupt other applications' networking access. In the example, a supervisor (e.g., guest OS 196, hypervisor 120, and/or host OS 118) receives application 150's request to disconnect, and execution of application 150 is temporarily suspended. The suspension may be responsive to application 150 sending the disconnect command, or responsive to the supervisor receiving the disconnect command. In an example, the supervisor (e.g., hypervisor 120), allocates a new segment of memory in memory device 114 equal or larger in size to HPAs 271B and 272B for use by application 150. The current contents of HPAs 271B and 272B are then copied to the newly allocated HPAs 273B and 274B. New virtual addresses are associated with these new physical addresses (e.g., GPA 253D and 254D with HPA 273A and 274A in hypervisor page table 210). The mappings of GVA 221B and 222B in page table 134 are then updated to correspond to GPAs 253B and 254B instead of their previous association to GPAs 251B and 252B. After this update is made, application 150 may resume execution. Upon resuming execution, application 150 will seamlessly be granted access to the data in GPAs 253B and 254B, which will be a different copy of the data from the copy still stored in GPA 251B and 252B that is still accessed by VI/O 194 via IOVAs 231A and 232A. Therefore, in systems 200 and 201, application 150 gains the advantage of sharing a copy of data with VI/O 194 for zero copy reception, which may typically improve reception latency by 15-20%. In order to then allow the shared memory locations (e.g., GPAs 251B and 252B) to be reused, the space saving advantages of zero copy reception are temporarily lost by making an extra copy of data in order to fulfill disconnection requests. However, significantly more time is typically spent connected to a device to receive data than spent to reclaim shared memory buffers, so overall, memory consumption is also greatly reduced by saving on copying data from a device memory buffer into a separate application memory buffer.

Figure 2C:
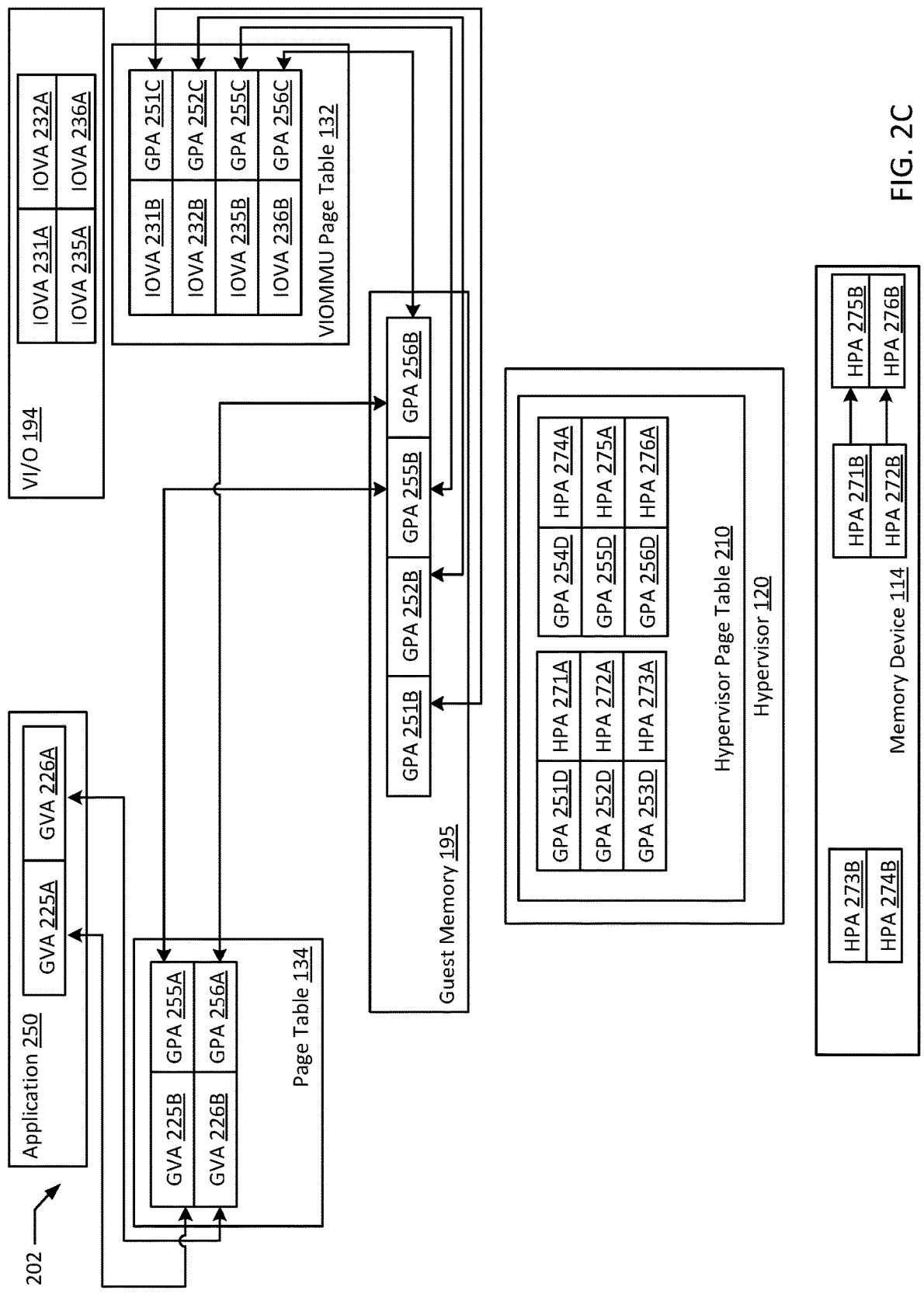

Illustrated system 202 in FIG. 2C depicts a later state of illustrated system 201. In system 202, VI/O 194 is holding on to GPAs 251B and 252B as a reception buffer associated with application 150, even though application 150 has already disconnected. In an example, the reception buffer at GPAs 251B and 252B is no longer actively being used by any application, and may be flagged as a disused shared memory buffer or disused receiving buffer. In an example, VI/O 194, guest OS 196, host OS 118, and/or hypervisor 120 is configured to reclaim these buffers associated with disconnected applications after the buffers are filled as part of a memory cleanup or garbage collection process. In an example, the buffers may be filled by messages targeting application 150 received after application 150 disconnects. The buffers may then be reclaimed with the data inside them discarded after the buffers are filled. In an example, a disused receiving buffer is one that is no longer being used by an application. However, disused receiving buffers may typically require being filled in order to allow a device (e.g., VI/O 194) to disconnect, and therefore may still allow data to be written. After an application (e.g., application 150) disconnects, a distinction is that the disconnected application loses access to the data in the now disused receiving buffer that was previously shared with the device (e.g., VI/O 194), and the receiving buffer is therefore disused from the perspective of the application.

Alternatively, the buffers may be filled with data associated with another application (e.g., application 250). In an example, application 250 is another application executing on guest 122. Application 250 has its own application memory space, which includes GVAs 225A and 226A, and application 250 requests to initialize zero copy message reception through VI/O 194, with GVAs 225A and 226A designated as a shared reception memory buffer. GVAs 225B and 226B are associated in page table entries in page table 134 with GPAs 255A and 256A which are in turn shared to VI/O 194 as GPAs 255C and 256C addressed by IOVAs 235A-B and 236A-B. In an example, GPAs 255A-D and 256A-D correspond to HPAs 275A and 276A in hypervisor page table 210.

In an example, VI/O 194 is configured to first fill any disconnected receiving buffer (e.g., GPA 251B, 252B) prior to filling any newly created receiving buffer. In the example, the first messages (or message fragments) received for application 250 will be stored in the remaining space in GPA 251B and/or 252B. In an example, the data thus stored may be copied by hypervisor 120 to the new buffer accessible to application 250. For example, the newly received data in HPA 271B and/or HPA 272B may be copied to HPA 275B and/or HPA 276B. After being filled, IOVA 231A-B and IOVA 232A-B (along with corresponding GPAs 251B-D and 252B-D, and HPAs 271A-B and 272A-B) may be reclaimed thereby reducing memory consumption. In an alternative example, the first message(s) received for application 250 may be routed to GPAs 251B and/or 252B to fill the disused receiving buffers previously shared with application 150 and simply discarded. In such a scenario, the message(s) (or packets of such message(s)) would likely be treated as lost due to a networking failure (e.g., as a dropped packet), and would be retransmitted and stored properly in GPA 255B and 256B upon retransmission (e.g., based on the sender failing to receive acknowledgement of receipt). For transmissions that are less latency critical, this type of initial reception delay may be preferable to context switching to supervisor mode to perform the data copy described above from the disused buffer to the new shared buffer between application 250 and VI/O 194. In an example, application 250 may be any application accessing the network, including a later execution state of application 150 reconnecting to VI/O 194.

Figure 2D:
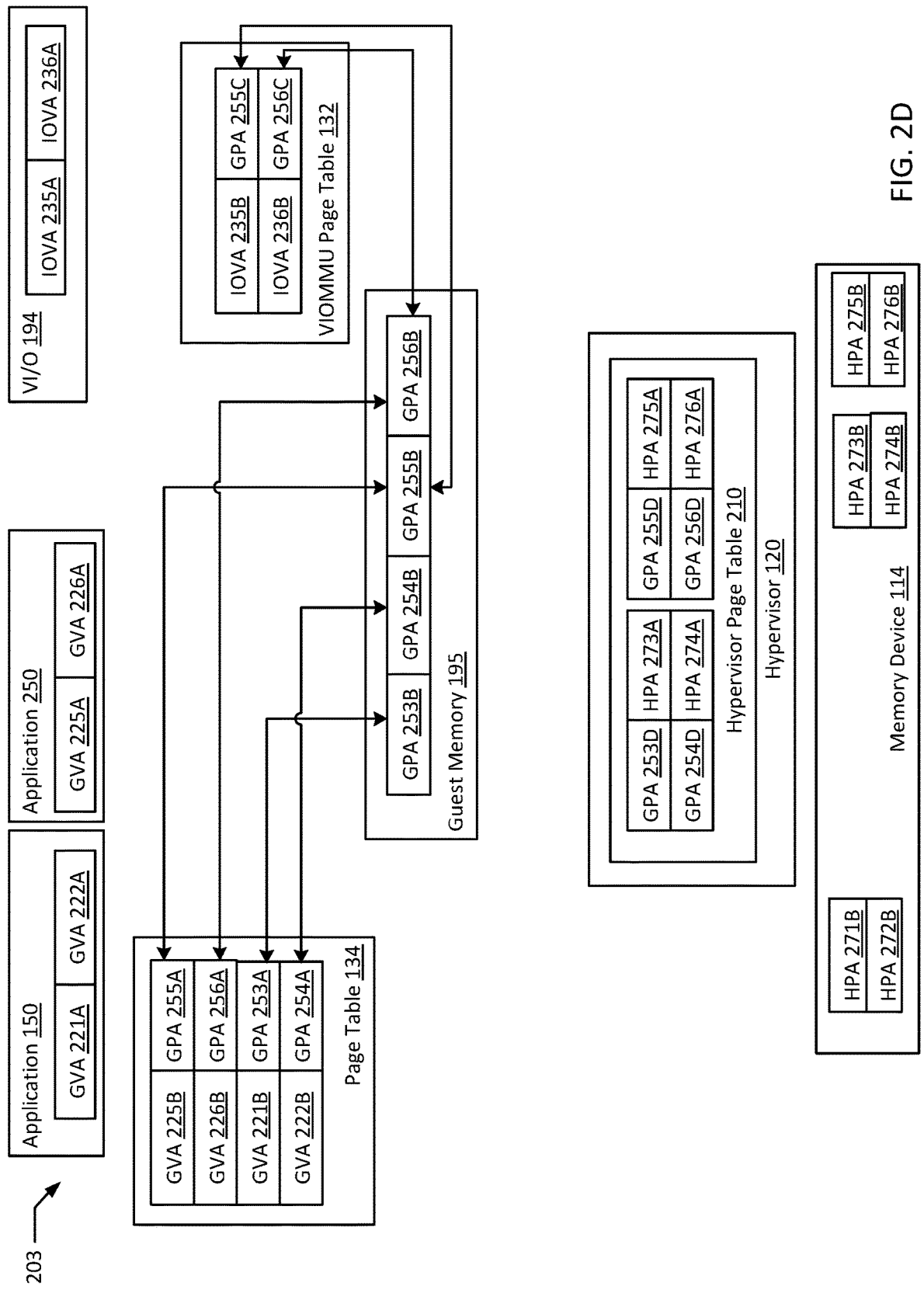

Illustrated system 203 in FIG. 2D depicts a later state of illustrated system 202, after GPAs 251A-D and 252A-D have been filled and reclaimed, and where applications 150 and 250 are different executable programs. In an example, GPAs 251A-D and 252A-D are reclaimed after being filled by VI/O 194 with data directed towards application 250. In the example, application 150 still has access to GVAs 221A and 222A, which were previously remapped to GPAs 253A and 254A. These addresses (GPAs 253A and 254A) were never accessible to VI/O 194, and therefore no corresponding entry mapped to GPAs 253A and 254A is present in VIOMMU page table 132, since GPAs 253A and 254A correspond to replacement memory locations assigned to application 150 by hypervisor 120 upon application 150 disconnecting from VI/O 194. In the example, application 250 currently shares a shared memory buffer for receiving messages with VI/O 194 in the form of a segment of memory addressed by GVAs 225A-B and 226A-B, GPAs 255A-D and 256A-D, and IOVAs 235A-B and 236A-B. In the example, messages targeted for routing to application 250 are received by VI/O 194, stored in IOVAs 235A and 236A (and therefore GPAs 255A-D and 256A-D, as well as HPAs 275A-B and 276A-B), and read directly by application 250 without needing to be copied again via GVAs 225A and 226A. In an example, each page table's (e.g., page table 134, VIOMMU page table 132, and hypervisor page table 210) page size for a page of memory need not directly match the page size in another page table, and offsets within a page of memory may be utilized to cause the various virtual addresses to refer to the same physical storage location in memory device 114. In an example, contents of messages stored in a shared buffer by VI/O 194 (e.g., in GPA 255A-D or 256A-D) may be read, copied, or otherwise processed (e.g., as an input) by application 250, and any results of processing such data contents may be stored in a different, unshared part of application 250's memory space.

Figure 3:
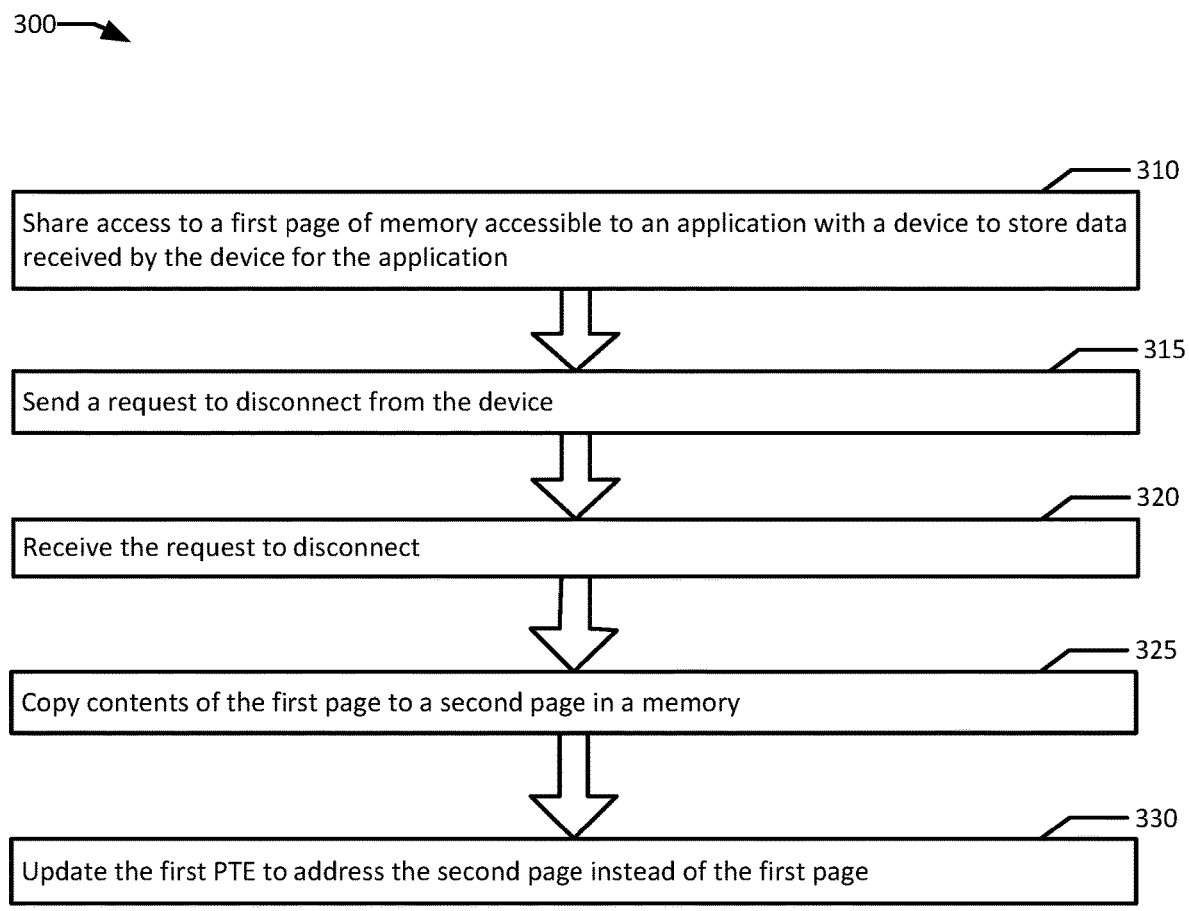
FIG. 3 is a flowchart illustrating an example of zero copy message reception for applications according to an example of the present disclosure.

FIG. 3 is a flowchart illustrating an example of zero copy message reception for applications according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by application 150 and hypervisor 120.

Example method 300 may begin with sharing, by an application, access to a first page of memory accessible to the application with a device to store data received by the device for the application (block 310). In an example, the application (e.g., application 150) has access to a plurality of application memory addresses (AMA) (e.g., GVA 221A, 222A) including a first AMA (e.g., GVA 221A), which is mapped to a page table entry (PTE) in a page table (e.g., page table 134) that addresses the first page (e.g., a page of memory at HPA 271B). In an example, application 150 allocates part of its application memory (e.g., addressed by GVA 221A) as a receiving buffer for storing messages received by a device (e.g., VI/O 194). In an example, VI/O 194 is a network interface or a storage device. In an example, memory access for application 150 and/or VI/O 194 is managed by a supervisor, which may be any supervisor with elevated access to memory as compared to application 150 or VI/O 194 (e.g., guest OS 196, hypervisor 120, host OS 118, etc.). In an example, the receiving buffer shared between application 150 and VI/O 194 (e.g., memory addressed by GVA 221A, GPA 251A, IOVA 231A) is configured as a message queue for queueing messages and message packets received by VI/O 194 for application 150. In an example, a data message may be assembled from the contents of multiple individual message packets received on the message queue. In an example, an IOMMU manages memory access to memory for devices (e.g., VI/O 194) on the system executing application 150 (e.g., guest 122). In such an example, VI/O 194 may access memory device 114 with virtual memory addresses mapped in and translated by an IOMMU page table (e.g., VIOMMU page table 132). In an example, a supervisor (e.g., hypervisor 120) may also grant a device (e.g., VI/O 194) direct access to memory addresses by mapping such memory addresses to the device's device memory space. For example, VI/O 194 may be configured to directly access contents of GPA 252B without an additional translation layer in between (e.g., IOVA 231B to GPA 251C).

The application sends a request to disconnect from the device (block 315). In an example, application 150 requests to stop receiving messages from VI/O 194. In an example, sending such a request causes execution application 150 to be suspended. For example, application 150 may be configured to suspend itself after sending a system call to disconnect from a device to guest OS 196. In another example, the supervisor (e.g., hypervisor 120) may be configured to pause execution of application 150 in response to receiving such a request.

A host supervisor of a host of the application and the device receives the request to disconnect (block 320). In an example, guest OS 196 receives the disconnection request, and issues a disconnection request to a driver of VI/O 194. In the example, hypervisor 120 may handle at least part of the disconnection request by segregating access to the shared memory buffer used for receiving messages for application 150. In an example, separating access is achieved by remapping the application's virtual memory addresses for the shared memory buffer to different underlying memory address. In some examples, access to the data then present in the shared buffer needs to be preserved for the application after disconnection so allocating new empty memory to application 150 is insufficient, even if doing so would be more efficient from a memory and processor use perspective.

The host supervisor copies contents of the first page to a second page in a memory of the host in response to receiving the request (block 325). In an example where it is desirable for application 150 to retain access to the contents of GPA 251B after disconnection, hypervisor 120 copies the contents of GPA 251B to a new address (e.g., GPA 253D). In an example, GPA 253D may be an unused address already in application 150's address space. In another example, hypervisor 120 may allocate additional memory to application 150, which may include memory addressed by GPA 253D. In doing so, hypervisor 120 creates a separate copy of the data in GPA 251B, so that going forward, after disconnection, application 150 and VI/O 194 can access different copies of the data.

The host supervisor updates the PTE to address the second page instead of the first page (block 330). In an example, to make the transition from GPA 251B to GPA 253B seamless to application 150, hypervisor 120 updates page table 134, so the page table entry corresponding to GVA 221B is associated with GPA 253A instead of GPA 251A. This way, application 150, in accessing GVA 221A now accesses GPA 253A instead of GPA 251A. However, VI/O 194 still accesses the previously shared memory buffer at GPA 251A when VI/O 194 accesses IOVA 231A. In an example, after application 150 disconnects from VI/O 194, hypervisor 120 may reclaim the memory addressed by GPA 251A-D and HPA 271A-B from VI/O 194. In an example, VI/O 194 may be reset or restarted to reclaim the memory for hypervisor 120. In another example, VI/O 194 may be configured to clean up used memory after the given segment of memory (e.g., the previously shared receiving buffer) is filled. In an example, VI/O 194 may use other data (e.g., targeted at another application, or artificial data) to fill the previously shared receiving buffer.

In an example, after application 150 disconnects from VI/O 194, application 250 requests to utilize VI/O 194 with zero copy message reception. In the example, application 250 assigns part of its application memory as a shared receiving buffer for messages received by VI/O 194 on behalf of application 250. In an example, application 250 assigns a page of memory addressed as GVA 225A as a part of this new shared buffer, which corresponds to GPA 255A. VI/O 194 is granted access to GPA 255A, for example, by hypervisor 120. In an example, GPA 255A may be mapped into VI/O 194's device memory space via a virtual memory address (e.g., IOVA 235A) in VIOMMU page table 132. In the example, both VI/O 194 and application 250 have access to this new shared buffer allowing application 250 to read data received by VI/O 194 directly, without making an additional copy.

In an example, when application 250 requests zero copy message reception, VI/O 194 has yet to fill its previous shared buffer with application 150 (e.g., a page of memory addressed by GPA 251B). In the example, GPA 251B and its corresponding addresses therefore represent wasted memory space on physical host 110 until reclaimed. In an example, GPA 251B may be efficiently reclaimed from VI/O 194 after it is fully utilized, however, since application 150 has disconnected from VI/O 194, additional outbound messages are no longer being sent by application 150, and therefore no responses are expected to be received directed towards application 150. In an example, VI/O 194 is configured to first fill any disused buffers prior to moving on to new shared buffers in order to facilitate reclamation of the disused buffers. In an example, broadcast messages without a target may be utilized to fill disused buffers. In an example, messages targeted for application 250 may be utilized to fill the previously shared buffer with application 150. In such examples, any data written to the disused buffer may be copied (e.g., by hypervisor 120), to the new shared buffer with application 250. In such a scenario, there would be an initial latency cost due to the copy operation to allow hypervisor 120 to reclaim the disused shared buffer (e.g., a memory page addressed by GPA 253A-D). Further data would be stored by VI/O 194 in the new shared buffer allowing zero copy access to application 250. Alternatively, data received for application 250 may also be stored in the disused shared buffer with application 150 and then discarded without copying. Discarding such message packets may then require the packets to be resent due to application 250 failing to receive the packets (e.g., triggering a networking timeout). In an example, discarding data may be more secure than allowing data to be written to a different application's buffer and then copying data by reducing the possibility of granting unintended access to such different application's data. In addition, discarding the data requires less processing by CPU 112. In an example, the behavior of hypervisor 120 may also be dictated by access credentials of application 250. For example, where application 250 is the same application as application 150 (e.g., a reconnection to VI/O 194 by application 150), access control concerns may be irrelevant and the same buffer may be reused. In addition, where applications 150 and 250 have the same access rights (e.g., are executing under the same account), there may be less potential for security concerns. In a typical example, GPA 251 would address memory that is outside of application 250's memory space and would therefore be memory that application 250 is restricted from accessing.

In an example, after a period of disuse, for example, where guest 122 is not transmitting messages, VIOMMU page table 132 may be swapped into slower memory (e.g., solid state drive or hard drive storage instead of DRAM) to clear room in memory device 114 for uses requiring faster memory access. In addition, page table 134 may be swapped into slower storage if application 150 is in a prolonged pause in execution (e.g., suspended) even if VI/O 194 is actively used by another application for message transmission.

Figure 4:
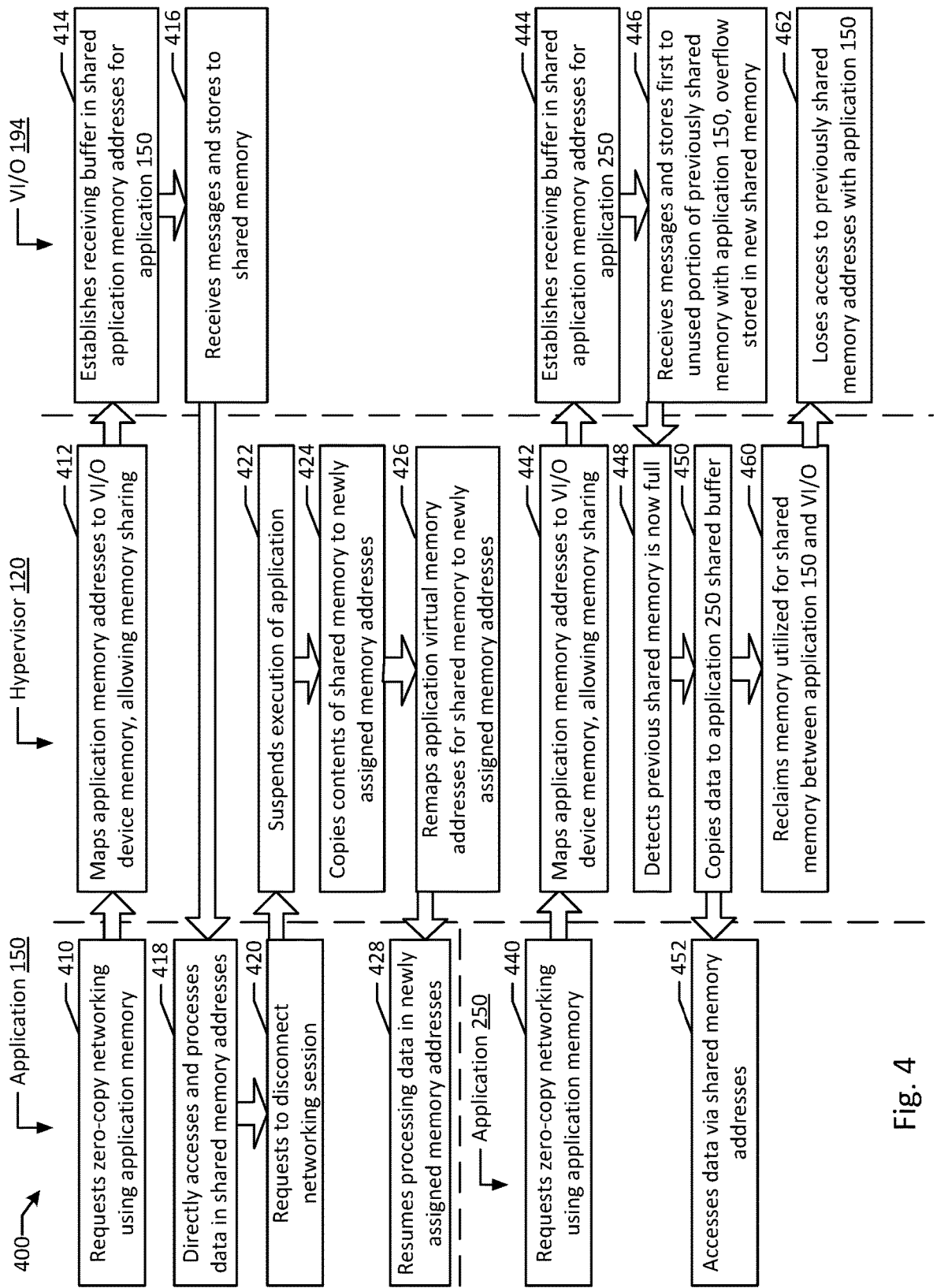
FIG. 4 is flow diagram of an example of a device providing zero copy message reception for applications on a host according to an example of the present disclosure.

FIG. 4 is flow diagram of an example of a device providing zero copy message reception for applications on a host according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, hypervisor 120, facilitates zero copy message reception through VI/O 194 for applications 150 and 250.

Application 150 initially requests zero-copy networking via VI/O 194, using part of application 150's allocated application memory as a shared receiving buffer with VI/O 194 (e.g., GVAs 221A, 222A) (block 410). In an example, hypervisor 120 maps GPAs 251A and 252A corresponding to GVAs 221A and 222A to VI/O 194's device memory space (e.g., via IOVAs 231A and 232A in page table entries in VIOMMU page table 132) thereby allowing application 150 and VI/O 194 to share memory (block 412). VI/O 194 establishes a receiving buffer using the shared application memory (e.g., GPAs 251C and 252C) for messages directed towards application 150 (block 414). In an example, application 150 may be a guest (e.g., container or VM) executing on guest 122 allowing VI/O 194 to easily segregate messages targeted to application 150 based on application 150's network address (e.g., IP address, MAC address). In an example, VI/O 194 receives messages for application 150 and stores them to the shared memory (e.g., via IOVAs 231A and 232A) (block 416). Application 150 then directly access the same memory locations where VI/O 194 stored the message data (e.g., via GVAs 221A and 222A mapped to the same memory locations as IOVAs 231A and 232A) (block 418). In an example, application 150 later requests to disconnect from its networking session and VI/O 194 (block 420). Hypervisor 120 suspends execution of application 150 after receiving application 150's disconnection request (block 422). After suspending execution of application 150, hypervisor 120 instructs the then current contents of GPAs 251A and 252A to be copied to unused pages of memory newly assigned for a duplicate receiving buffer created for application 150 (e.g., at GPAs 253A and 254A) (block 424). Hypervisor 120 then remaps application 150's virtual memory addresses (e.g., GVAs 221A and 222A) mapped to the shared memory (e.g., the receiving buffer that includes GPAs 251A and 252A) to the newly assigned memory addresses (e.g., GPAs 253A and 254A) (block 426). Application 150 is resumed and continues processing data at GVAs 221A and 222A, but this is now the recently copied data at GPAs 253A and 254A rather than the copy at GPAs 251A and 252A that is still accessible to VI/O 194 (block 428).

In an example, after application 150 disconnects from VI/O 194, application 250 requests zero-copy networking via VI/O 194, and assigns a portion of its own application memory (e.g., memory mapped to GVAs 225A and 226A, which are virtual memory addresses for GPAs 255A and 256A) to VI/O 194 as a shared memory receiving buffer for storing messages received that are directed towards application 250 (block 440). In the example, hypervisor 120 maps GPAs 255A and 256A into VI/O 194's device memory space (e.g., as IOVAs 235A and 236A), thereby allowing memory sharing between application 250 and VI/O 194 (block 442). VI/O 194 establishes a receiving buffer using the shared application memory (e.g., GPAs 255C and 256C) for messages directed towards application 250 (block 444).

In an example, VI/O 194 is configured to first fill application 150's now disused receiving buffer to allow GPAs 251C and 252C to be reclaimed. In the example, VI/O 194 receives messages for application 250, and first stores these messages to the unused portion of GPAs 251C and 252C, before storing any data that does not fit into the new shared buffer with application 250 (e.g., GPAs 255C and 256C) (block 446). In the example, hypervisor 120 detects that the previous shared memory buffer (e.g., GPAs 251C and 252C) is now full (block 448). Hypervisor 120 then copies the data stored for application 250 from the previous shared memory buffer shared with application 150 to the new buffer that is accessible to application 250 (e.g., from GPAs 251C and 252C to GPAs 255C and 256C) (block 450). In an example, hypervisor 120 performing a copy operation between the previous buffer and the new buffer may be triggered by any write to the previous buffer and need not rely on the previous buffer being filled. For example, hypervisor 120 may be configured to be alerted based on the memory locations of the previous buffer being modified, thereby triggering data copying from the previous buffer to the new one. In such examples, the previous buffer may be filled incrementally over multiple messages, and memory reclamation may finally be triggered when the previous buffer is full. In an example, application 250 accesses the data received by VI/O 194 via its shared memory buffer with VI/O 194 (e.g., by accessing GPAs 255A and 256A via GVAs 225A-B and 226A-B) (block 452). In an example, after copying the data from the filled shared memory buffer between application 150 and VI/O 194 to the new shared memory buffer shared between application 250 and VI/O 194, hypervisor 120 reclaims the memory utilized for the filled shared memory buffer (e.g., GPAs 251C and 252C) (block 460). In an example, the memory addresses of the old shared memory buffer are unmapped from VI/O 194's device memory space and VI/O 194 loses access to GPAs 251C and 252C (block 462).

FIG. 5 is a block diagram of an example zero copy message reception system according to an example of the present disclosure. Example system 500 includes host 510 with memory 514, device 518 with access to device memory addresses 220 and 221, processor 512, and supervisor 525. Application 550 has access to application memory addresses 530 and 531, with application memory address 530 mapped to page table entry 552 in page table 555. Application 550 is configured to execute on processor 512 to share access to memory page 560 addressed by application memory address 530 with device 518 to store data 570 received by device 518 for application 550, where memory page 560 is mapped as device memory address 520. Application 550 later sends request 590 to disconnect from device 518. In response to receiving request 590 from application 550, supervisor 520 is configured to copy the contents 570 of memory page 560 to memory page 561 (e.g., copied as contents 570'). Supervisor 520 then updates page table entry 552 to address memory page 561 instead of memory page 560.

Zero copy message reception as described in the present disclosure enables applications to obtain the latency benefits of eliminating copying data between device memory and application memory, which also results in reduced processor usage since the processor does not need to perform a copy operation. Implementing zero copy message reception as described herein may not always result in a complete, true zero copy operation, but data copy operations are typically reserved for the start or end of a given application's session utilizing a device, and therefore zero copy memory savings are generally realized during ordinary operation as well. For example, while a transient second copy may be made in order to fill a disused shared memory buffer to allow the disused shared memory buffer to be reclaimed, after that disused shared memory buffer is in fact filled, the memory used can be returned to the host system and unmapped by the device. Similarly, while a disconnecting application temporarily generates a second copy of data, the first copy is eliminated after the device fills its shared memory buffer with the disconnected application. Therefore, zero copy message reception results in higher networking throughput and reduced processing cycles, which results in reduced networking latency, higher processing efficiency, reduced heat generation, and reduced overall memory consumption.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a host with a first device which includes a memory, a different second device with access to a plurality of device memory addresses, a processor, and a supervisor; and
a first application with access to a first plurality of application memory addresses (AMA), including a first AMA mapped to a first page table entry (PTE) in a first page table, wherein the first application is configured to execute on the processor to:
designate a portion of the first plurality of AMAs as a receiving buffer;
provide the receiving buffer for data from the second device;
share access to a first page of the memory addressed by the first AMA with the second device to store data received by the second device for the first application, wherein the first page is mapped as a device memory address of the plurality of device memory addresses to provide the receiving buffer for data sent through the second device to the first application; and
later send a request to disconnect from the second device;
wherein the supervisor is configured to:
responsive to receiving the request to disconnect, copy contents of the first page to a second page in the memory; and
update the first PTE to address the second page instead of the first page.

2. The system of claim 1, wherein the second device is one of a network interface or a storage device.

3. The system of claim 1, wherein the supervisor is one of a hypervisor or a host operating system.

4. The system of claim 1, wherein the supervisor assigns the second page to the first application.

5. The system of claim 1, wherein the first application is suspended after requesting to disconnect from the second device.

6. The system of claim 1, wherein the second device continues to access the first page after the first PTE is remapped to the second page.

7. The system of claim 1, wherein the first page is reclaimed by the supervisor, and any remaining data in the first page is discarded.

8. The system of claim 1, wherein a second application shares a third page of memory with the second device to store data received by the second device for the second application.

9. The system of claim 8, wherein the second device stores first data directed to the second application to the first page, and the supervisor is further configured to:
copy the first data to the third page; and
after copying the first data, reclaim the first page from the second device, wherein the second device stores second data directed to the second application to the third page.

10. The system of claim 8, wherein the second device stores first data directed to the second application to the first page which is inaccessible to the second application, and the second device subsequently receives a second copy of the first data which is stored in the third page.

11. The system of claim 10, wherein the first copy of the first data is handled as a failed transmission.

12. The system of claim 8, wherein the second application is the first application at a later point in time.

13. The system of claim 1, wherein the first page is configured as a message queue of the second device.

14. The system of claim 1, wherein the plurality of device memory addresses are virtual memory addresses mapped in a IOMMU page table, and an IOMMU manages the second device's access to the memory.

15. The system of claim 1, wherein the second device accesses contents of the device memory address through direct memory access.

16. A method comprising:
designating, by a first application, a portion of application memory as a receiving buffer, wherein the first application has access to a first plurality of application memory addresses (AMA) including a first AMA, which is mapped to a page table entry (PTE) in a page table that addresses a first page of memory;
providing the receiving buffer for data from a second device;
sharing, by the first application, access to the first page of memory, which is included in the first device and accessible to the first application with the second device, which is different from the first device, to store data received by the second device for the first application, to provide the receiving buffer for data sent through the second device to the first application;
sending, by the first application, a request to disconnect from the second device;
receiving, by a host supervisor of a host of the first application and the second device, the request to disconnect;
responsive to receiving the request, copying contents of the first page to a second page in the memory; and
updating the PTE to address the second page instead of the first page.

17. The method of claim 16, wherein the second device is one of a network interface or a storage device, and the host supervisor is one of a hypervisor or a host operating system.

18. The method of claim 16, wherein the second device continues to access the first page after the PTE is remapped to the second page.

19. The method of claim 16, further comprising:
sharing, by a second application, a third page of memory with the second device to store data received by the second device for the second application;
storing, by the second device, first data directed to the second application to the first page;
copying, by the host supervisor, the first data to the third page;
after copying the first data, reclaiming the first page from the second device; and
storing, by the second device, second data directed to the second application to the third page.

20. A computer-readable non-transitory storage medium storing executable instructions, which when executed by a computer system, cause the computer system to:
designate, by an application, a portion of application memory as a receiving buffer, wherein the application has access to a plurality of application memory addresses (AMA) including a first AMA, which is mapped to a page table entry (PTE) in a page table that addresses the first page;
provide the receiving buffer for data from a second device;
share, by the application, access to the first page of memory, which is included in the first device and accessible to the application with the second device, which is different from the first device, to store data received by the second device for the application, to provide the receiving buffer for data sent through the second device to the first application;
send, by the application, a request to disconnect from the second device;
receive, by a host supervisor of a host of the application and the second device, the request to disconnect;
responsive to receiving the request, copy contents of the first page to a second page in the memory; and
update the PTE to address the second page instead of the first page.

\* \* \* \* \*